United States Patent Office 2,847,441
Patented Aug. 12, 1958

2,847,441

ALIPHATIC POLY (OXYMETHYLISOTHIOCYANATES) AND METHODS FOR MAKING THEM

Sidney Melamed, Philadelphia, Pa., assignor to Rohm & Haas Company, Philadelphia, Pa., a corporation of Delaware No Drawing. Application April 15, 1955
Serial No. 501,707

9 Claims. (Cl. 260—454)

The present invention is concerned with the production of novel chemical compounds in the class of the polyisothiocyanates. More particularly, the compounds of the invention are aliphatic polyisothiocyanates in which each isothiocyanato group is attached to the carbon of a methoxy group whose oxygen atom is attached to a carbon atom of an aliphatic type of group. As will be pointed out more particularly hereinbelow, the new compounds have various uses including outstanding reactivity toward amines and amides.

The compounds of the present invention are those having the structure of Formulas I and II as follows:

(I) $SCNCH_2O—R—OCH_2NCS$ where R is selected from the group consisting of a cyclohexylene group

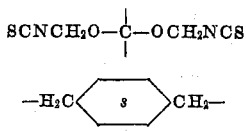

and

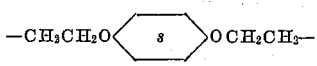

where $s$ indicates that the ring is saturated, an alkylene group of 2 to 10 carbon atoms, having at least 2 carbons in a chain extending between the two oxygen atoms, and a group of the formula $—R'(OR')_n—$ wherein $n$ is an integer having a value of 1 to 4 and $R'$ is an alkylene group of 2 to 3 carbon atoms having at least 2 carbon atoms in a chain extending between the adjoined oxygen atoms:

(II) $C(CH_3)_{4-m}(CH_2OCH_2NCS)_m$ where $m$ is an integer having a value of 3 to 4.

It has been found that the new compounds can be produced directly from aliphatic compounds containing two or more chloromethoxy groups ($—OCH_2Cl$) by reaction with inorganic thiocyanates such as ammonium, potassium, or sodium thiocyanate. Unexpectedly, the isothiocyanate is obtained directly when the aliphatic compounds containing a plurality of chloromethoxy groups are reacted with an inorganic thiocyanate even at low temperatures of room temperature up to about 60° C.

This procedure has the advantages that it (1) avoids the use of amines which are relatively expensive and (2) it does not employ hazardous reagents such as carbon disulfide, both of which types of compounds were generally used heretofore for making isothiocyanates.

The reaction is performed in an anhydrous medium, such as in dry acetone or petroleum ether, which serve as solvents for the starting materials and the product. Generally, two moles or more of the inorganic thiocyanate is reacted with each mole of a dichloromethoxy compound. When more than two chloromethoxy groups are present in the starting compound, a corresponding additional molar quantity of the inorganic thiocyanate is used. The temperature may be from 0° C. to 60° C., room temperature being quite satisfactory in most cases. A reaction period of several hours such as from 3 to 48 hours may be employed. At the conclusion of the reaction, the solvent contains the isothiocyante in solution. At this point, the salt may be filtered off and the solvent may be stripped off by distillation of the filtrate leaving the polyisothiocyanate product.

The chloromethoxy compounds used as the starting materials for the above reaction are generally known and they may be prepared by the reaction of formaldehyde and hydrogen chloride with glycols, glycol ethers and polyols, such as ethyleneglycol, diethyleneglycol, decamethyleneglycol, penta-erythritol, tris(hydroxymethyl)ethane, trimethyleneglycol, propyleneglycol, 1,2-, 1,3-, and 1,4-dihydroxycyclohexanes, bis(methylolcyclohexane) and bis-(hydroxyethoxy)cyclohexane. Generally, the formaldehyde and hydrogen chloride used in this reaction should be substantially dry. For example, dry hydrogen chloride may be bubbled into a mixture of the polyol with para-formaldehyde containing 3% to 9% moisture. There may be present solvents such as the diethyl ether of diethyleneglycol, ether itself, benzene, chloroform, or the like. The temperature is generally controlled by cooling to be maintained between 0° to 50° C. The time of reaction may be from 1 to 8 hours, the time being reduced if desired by resorting to higher temperatures within the range stated and superatmospheric pressures. The poly(chloromethoxy)compounds may be separated from the water by drying, or by adding chloroform or benzene, separating the water layer, and distilling the solvent from the organic layer at temperatures of 40° to 50° C. or so.

The compounds are useful as fungicides, insecticides and also as difunctional reactants for condensation with polyamines to produce polythioureas which are adapted to form valuable films, fibers and other plastic products by suitable shaping operations, as by extrusion of a molten mass or solution containing such polythioureas. An example of a polyamine that may be so co-reacted is hexamethylenediamine. The compounds may be reacted with monoamines, such as p-chloroaniline, toluidine or anisidine to produce compounds which serve as insecticides or plasticizers for polymeric materials, such as cellulose esters, especially cellulose nitrate and cellulose acetate, and polyvinyl chlorides including the homopolymers and copolymers with vinyl acetate, acrylonitrile, vinylidene chloride and so on.

In the new compounds of the present invention, the oxymethylene group has an important influence on the solubility of the compounds. These oxymethylene groups impart polarity, rendering the compounds soluble in such polar solvents as alcohols, ether-alcohols, ethers and so on.

Because of the oxymethylene groups to which the thiocyanate radicals are attached, the compounds produce thiourea derivatives on reaction with amines which may be incorporated with other amine-containing or amide-containing compounds such as urea, thiourea, triazines including melamine or their formaldehyde condensates. When such combinations are provided with an acid catalyst and subsequently applied to textiles for crease-proofing or other purposes, the thiourea derivative splits the oxygen atoms obtained from the methoxy groups of the polyisothiocyanate to provide three components, each of which reacts with the other amine-containing or amide containing compounds or their formaldehyde condensates. The conversion to infusible and insoluble condition thereby obtained during the baking or curing step results in a product characterized by internal plasticization as the result of the combination with the polyhydroxy aliphatic compound split off from the thiourea derivative. In the examples, which are illustrative of the invention, the parts and percentages, unless otherwise noted, are by weight:

Example 1

(a) A 500 cc. round bottom flask was equipped with a mechanical stirrer, dropping funnel and reflux condenser with calcium chloride tube. The flask was then charged with 47.0 grams (0.6 mole) of sodium thiocyanate and 300 cc. of acetone which had been dried over magnesium sulfate. The contents of the flask were stirred and cooled in a water bath, while 61.0 grams (0.25 mole) of 1,6-bis-chloromethoxy-2,5-dimethylhexane was added dropwise over a period of fifteen minutes.

The reaction mixture was allowed to stir at room temperature for three hours and then filtered. The salt filter cake was washed with an additional 200 cc. of boiling acetone. A small amount of acetone was added to the filtrate to replace that lost by evaporation and to bring the volume to 500 cc. The filtrate then divided into two 250 cc. aliquots, each of which on stripping produced about 0.25 mole of product. The product is an oily liquid having fungicidal activity.

(b) Reaction of the product of part (a) with benzylamine produced 1,6-bis-(N-benzylthioureidomethoxy)-2,5-dimethylhexane, thereby establishing the product of part (a) to be 1,6-bis-(isothiocyanomethoxy)-2,5-dimethylhexane. The reaction is performed as follows:

To a solution of 0.25 mole (69 grams) of 1,6-bis-isothiocyanomethoxy)-2,5-dimethylhexane in 250 cc. of acetone there was added with cooling and shaking 53.5 grams (0.5 mole) of benzylamine and then the mixture was allowed to stand at room temperature overnight. The acetone was then removed by evaporation at reduced pressure, and the oily residue was then crystallized from ether by plunging the ether solution into a Dry Ice-acetone bath. After two recrystallizations in this manner, 24.5 grams (20% yield) of pale pink crystals were obtained corresponding to 1,6-bis-(N-benzylthioureidomethoxy) - 2,5 - dimethylhexane. *Analysis.*—Calculated for $C_{26}H_{38}N_4O_2S_2$: N, 11.15; S, 12.8. Found: N, 10.4; S, 12.7.

Example 2

(a) The procedure of Example 1 is repeated replacing the bis-chloromethoxydimethylhexane with the dichloromethyl ether of diethyleneglycol.

(b) Reaction of the product of part (a) with benzylamine as in Example 1 (b) produces di-(N-benzylthioureidomethoxyethyl)ether, thereby establishing the product of part (a) to be di-(isothiocyanomethoxyethyl)-ether.

Example 3

(a) The procedure of Example 1 is repeated substituting for the bis-chloromethoxydimethylhexane, 0.1 mole of tetra(chloromethoxy)methane.

(b) Reaction of the product of part (a) with benzylamine as in Example 1 (b) but using 1 mole of the amine for each 0.25 mole of the product of part (a) hereof produces tetra-(N-benzylthioureidomethoxy)-methane thereby establishing the product of part (a) to be tetra-(isothiocyanomethoxy)methane.

Example 4

One gram mole of hexamethylenediamine and one gram mole of the diisothiocyanate produced in Example 1 (a) are run in two separate streams into a reaction vessel containing benzene maintained at 0° to 20° C. by the application of external cooling and continuous agitation. The polythiourea obtained by the reaction between the diamine and the diisothiocyanate precipitates as it is formed. The condensation polymer thus precipitated is separated by filtration and dissolved in dimethylformamide. The solution containing 20% of the condensation polymer is then extruded through spinnerets into an aqueous coagulating bath to form fibers which may be stretched to increase their strength. By extrusion through slot-shaped orifices, films or sheets may be obtained from the dimethylformamide solution. The condensation polymer may also be heated to a molten condition and molded into any shape desired.

Example 5

Two gram moles of p-chloroaniline are gradually added into one gram mole of the diisothiocyanate obtained in Example 1 (a). The 1,6-bis-(p-chlorophenyl-thioureidomethoxy)-2,5-dimethylhexane thereby obtained is dried and mixed with talc and clay to form a 5% dust. When dusted on beans, the composition thereby produced served as a highly effective stomach poison for the bean beetle.

Example 6

The procedure of Example 1 is repeated substituting for the bis-chloromethoxydimethylhexane, 0.25 mole of 1,2-bis-(chloromethoxy)-cyclohexane. The product obtained, 1,2-bis-(isothiocyanomethoxy)-cyclohexane, is an oily liquid which is highly reactive toward amines.

Example 7

The procedure of Example 1 is repeated substituting for the bis-chloromethoxydimethylhexane, 0.25 mole of 1,4-bis-(chloromethoxyethoxy)-cyclohexane. The product obtained, 1,4-bis-(isothiocyanomethoxyethoxy)-cyclohexane, is an oily liquid which is highly reactive toward amines.

Example 8

A reaction product of dodecylamine and the bis-isothiocyanate of Example 1 (a), namely 1,6-bis-(N-dodecylthioureidomethoxy)-2,5-dimethylhexane, is prepared essentially as described in Example 1 (b) substituting dodecylamine for the benzylamine.

A mixture is prepared from 20 parts of this bis-thiourea and 80 parts of a urea-formaldehyde-methanol condensate (approximate mole proportions 1:1.7:3) containing ½% of ammonium chloride. This mixture is used to impregnate paper sheets which are then laminated and heated under pressure to form a hard, water-resistant board suitable for construction purposes. The addition of the bis-thiourea imparts increased water-resistance and toughness to the board over the use of the urea condensate alone.

It is to be understood that changes and variations may be made without departing from the spirit and scope of the invention as defined by the appended claims.

I claim:

1. A compound selected from the group consisting of those having the structure of formulas (I) 

(II) 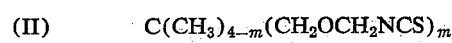

where R is selected from the group consisting of cyclohexylene

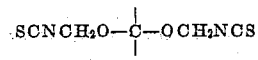

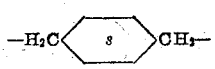

and

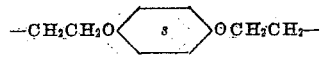

where $s$ indicates that the ring is saturated; an alkylene group of 2 to 10 carbon atoms having at least 2 carbons in a chain extending between the two oxygen atoms, and a group of the formula —R'(OR')$_n$— wherein $n$ is an integer having a value of 1 to 4 and R' is an alkylene group of 2 to 3 carbon atoms having at least 2 carbon atoms in a chain extending between the adjoined oxygen atoms, and $m$ is an integer having a value of 3 to 4.

2. 1,6-bis-(isothiocyanomethoxy)-2,5-dimethylhexane.
3. Di-(isothiocyanomethoxyethyl)-ether.
4. Tetra-(isothiocyanomethoxy)-methane.
5. 1,2-bis-(isothiocyanomethoxy)-cyclohexane.
6. 1,4-bis-(isothiocyanomethoxyethoxy)-cyclohexane.
7. A compound of the formula $$SCNCH_2O\!-\!R\!-\!OCH_2NCS$$

where R is an alkylene group of 2 to 10 carbon atoms having at least two carbon atoms in a chain extending between the two oxygen atoms.

8. A method comprising reacting in an anhydrous medium an inorganic thiocyanate selected from the group consisting of ammonium and alkali metal thiocyanates with a compound selected from the group consisting of those having the formula $$ClCH_2OROCH_2Cl$$

where R is selected from the group consisting of cyclohexylene

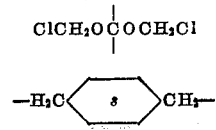

and

where $s$ indicates that the ring is saturated, an alkylene group of 2 to 10 carbon atoms having at least 2 carbons in a chain extending between the two oxygen atoms, and a group of the formula $-R'(OR')_n-$ wherein $n$ is an integer having a value of 1 to 4 and $R'$ is an alkylene group of 2 to 3 carbon atoms having at least 2 carbon atoms in a chain extending between the adjoined oxygen atoms, and those having the formula $$C(CH_3)_{4-m}(CH_2OCH_2Cl)_m$$

where $m$ is an integer having a value of 3 to 4, and isolating an aliphatic polyisothiocyanate as defined in claim 1.

9. A process as defined in claim 8 in which the temperature is 0° to 60° C.

References Cited in the file of this patent
UNITED STATES PATENTS

| | | |
|---|---|---|
| 2,139,335 | Shoemaker | Dec. 6, 1938 |
| 2,439,514 | Herndon | Apr. 13, 1948 |
| 2,594,979 | Nelson | Apr. 29, 1952 |

FOREIGN PATENTS

| | | |
|---|---|---|
| 656,643 | Great Britain | Aug. 29, 1951 |

OTHER REFERENCES

Degering: An Outline of Organic Nitrogen Compounds, 1945 (p. 548, paragraph 1748).